Oct. 22, 1940.                    W. H. WILCOX                    2,219,155
                    DIMENSION AND WARP DETECTOR FOR OBJECTS
                    Filed July 12, 1939          5 Sheets-Sheet 2
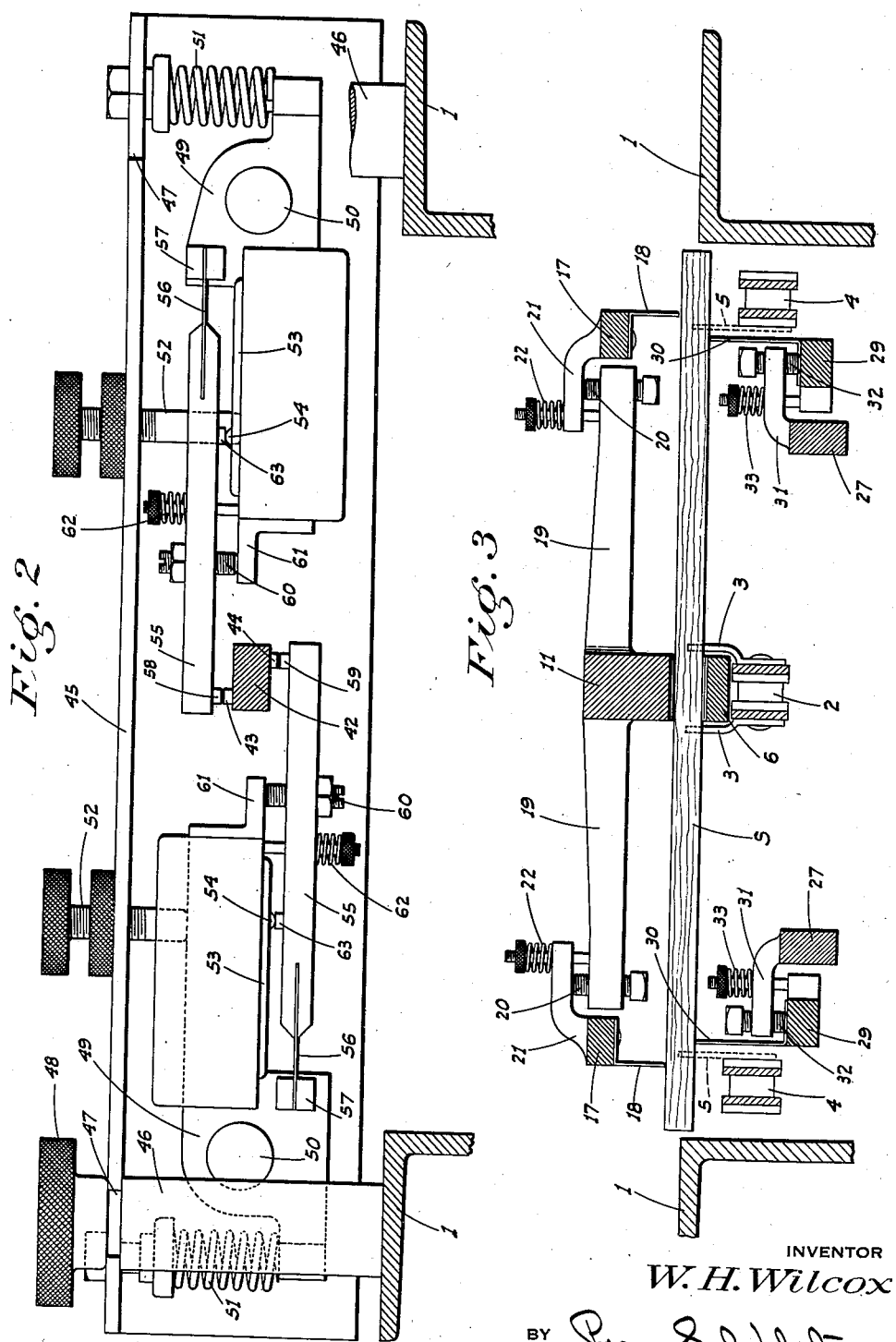
INVENTOR
*W. H. Wilcox*
BY 
ATTORNEY

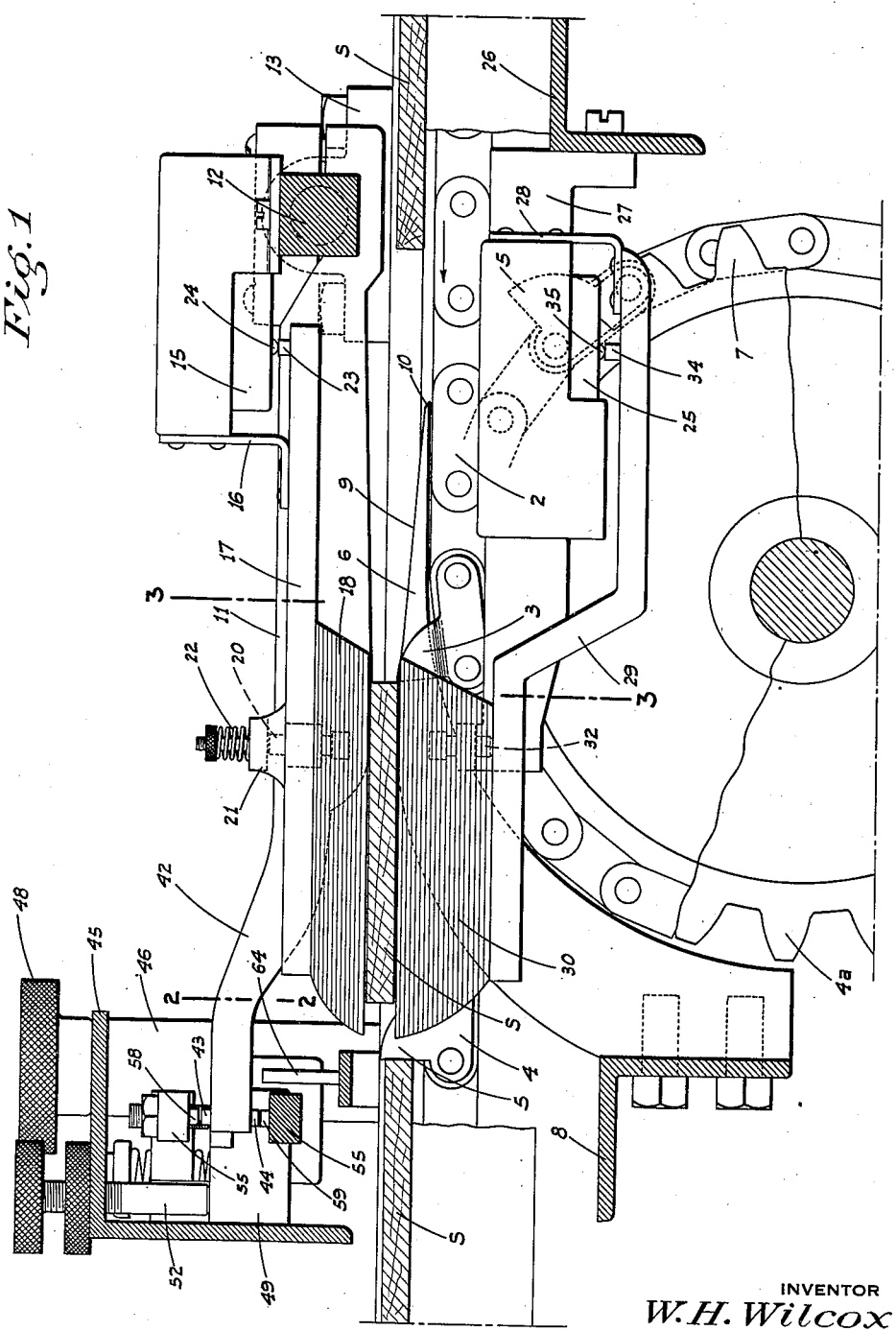

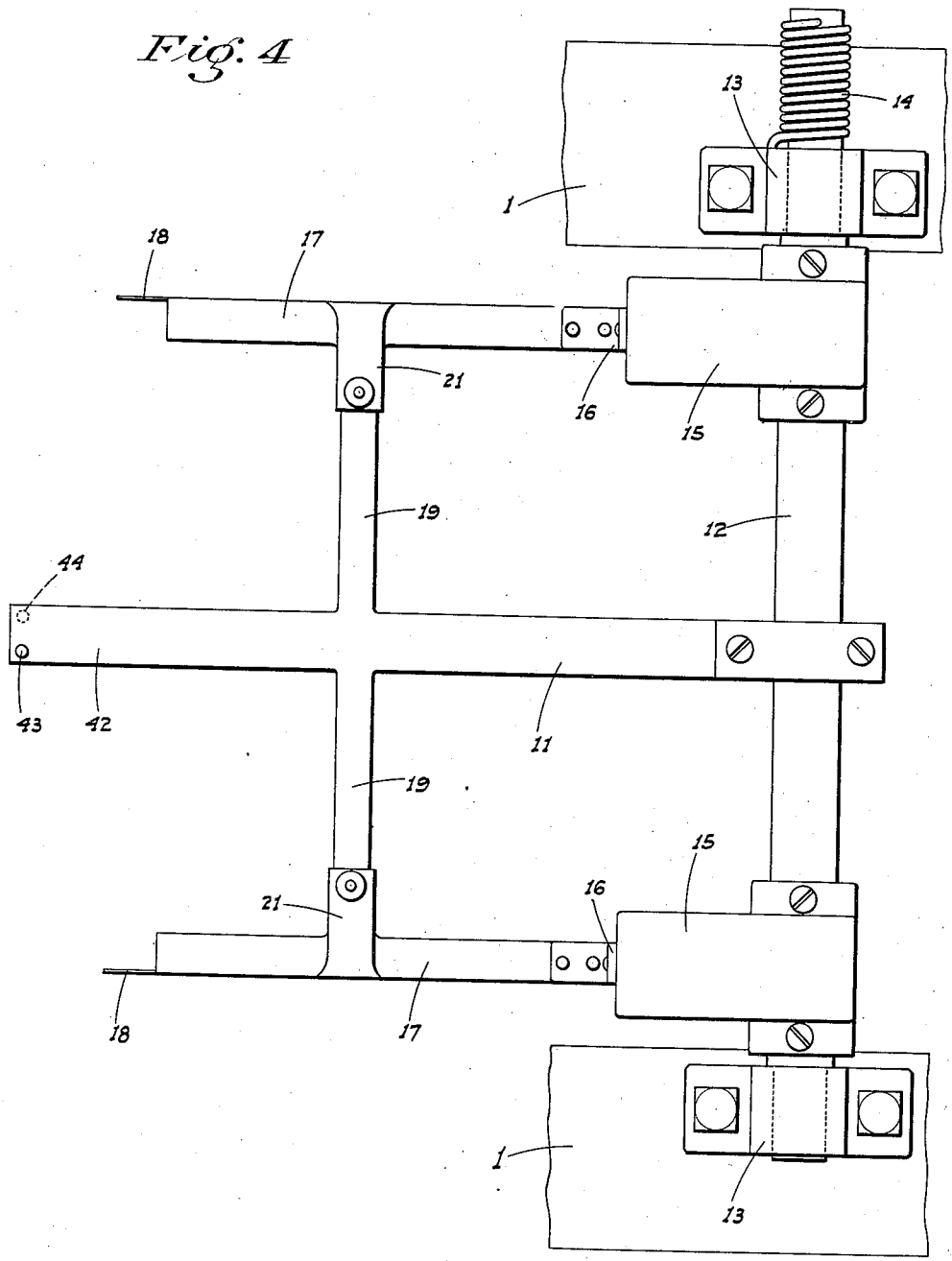

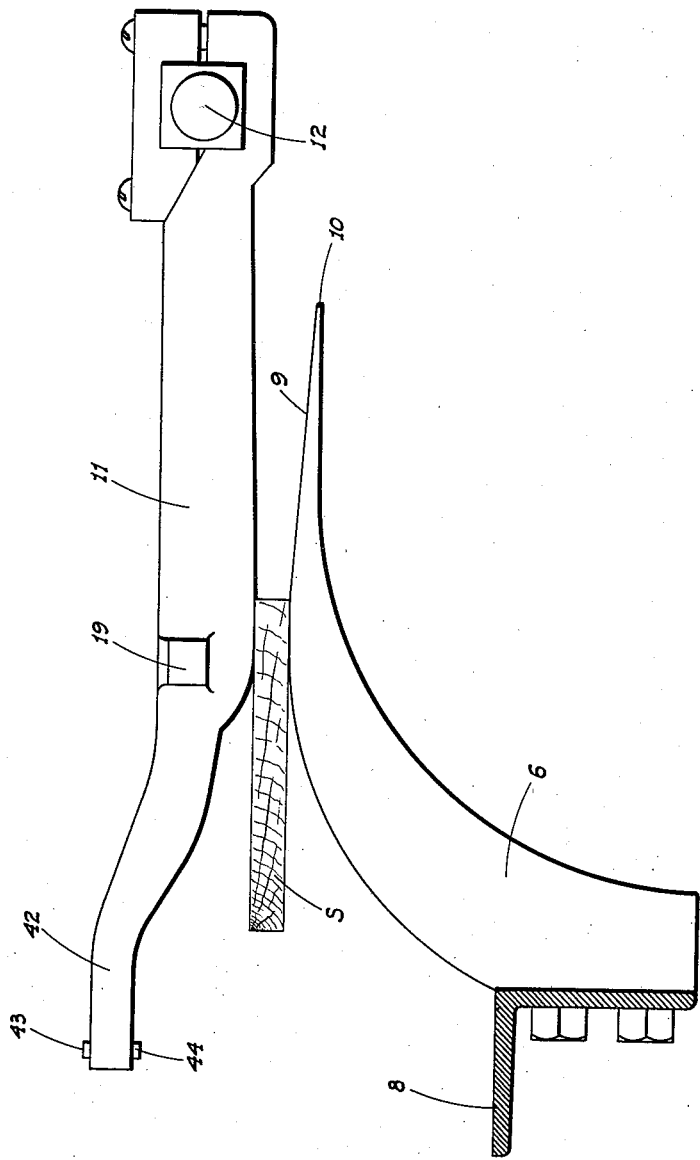

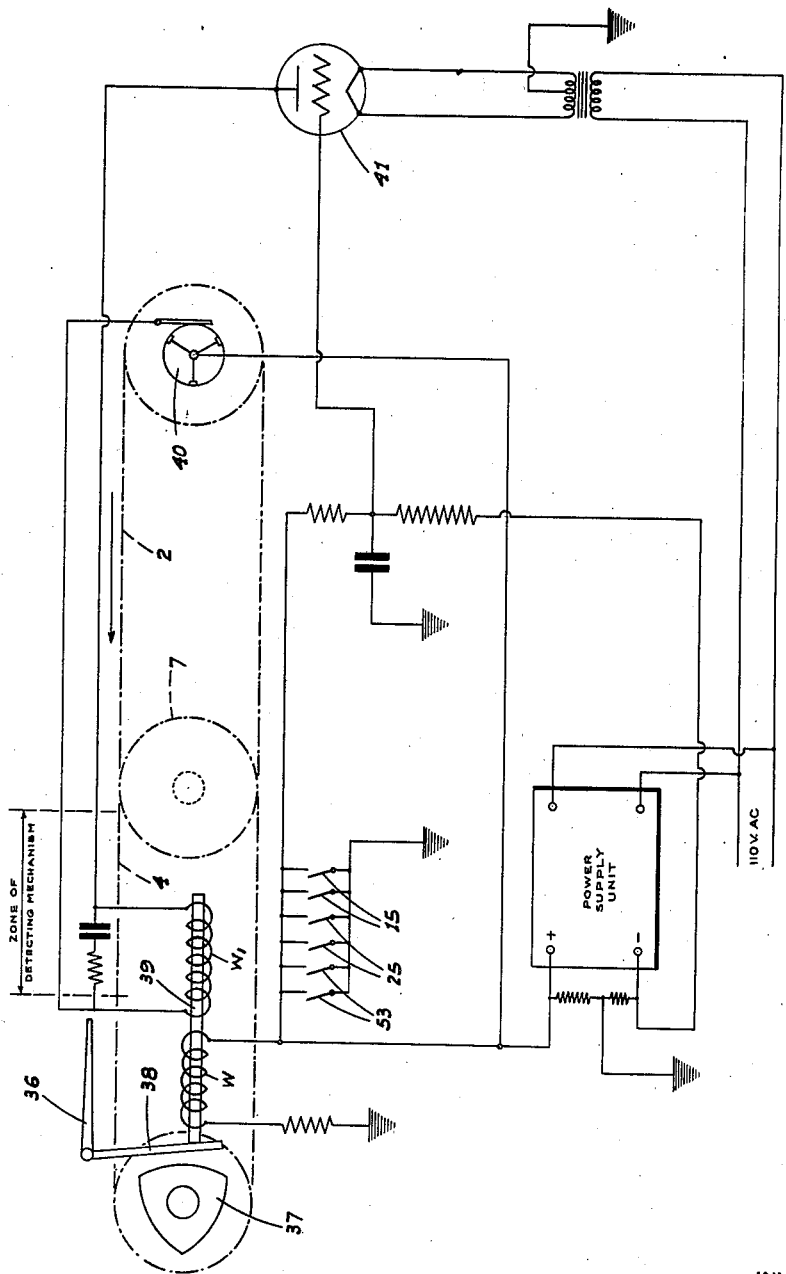

Patented Oct. 22, 1940

2,219,155

UNITED STATES PATENT OFFICE 2,219,155

DIMENSION AND WARP DETECTOR FOR OBJECTS

William H. Wilcox, Stockton, Calif., assignor to California Cedar Products Company, a corporation of California Application July 12, 1939, Serial No. 284,008

21 Claims. (Cl. 209—88)

This invention relates generally to an improvement in machines for detecting characteristics of objects and segregating the objects according to such characteristics; the invention being directed in particular to improvements over that certain article segregating machine as shown in my copending application for United States Letters Patent, Ser. No. 242,600, filed November 26, 1938.

The principal object of the present invention is to provide improved detecting apparatus for article segregating machines; such apparatus, by a novel combination of parts, being arranged to detect both variations in thickness of an object, as well as undesirable warp of the exterior surfaces thereof in any direction.

Another object of the invention is to provide, in unitary assembly, detecting apparatus, as above, designed so that the thickness detecting mechanism and the warp detecting mechanism, while having certain elements in common, will function simultaneously but independently of the other mechanism and without effect by the characteristics of the object which the other mechanism is arranged to detect.

As in the copending application, the apparatus is intended particularly for use in connection with the manufacture of pencil slats, and while the hereinafter described structure is arranged solely for detecting and segregating pencil slats according to certain characteristics, it is obvious that the invention could be adapted to other objects.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation, partly in section, of the improved detecting apparatus.

Figure 2 is a cross-sectional elevation on line 2—2 of Fig. 1.

Figure 3 is a cross-sectional elevation on line 3—3 of Fig. 1.

Figure 4 is a top plan view of the upper feeler unit.

Figure 5 is a side elevation of the fixed slat supporting shoe and the yieldable slat hold-down arm; a pencil slat being engaged therebetween.

Figure 6 is a diagrammatic view of the electrical circuit.

Referring now more particularly to the characters of reference on the drawings, the slat conveying and segregating apparatus with which the present invention is associated is in all substantial respects the same as in the above identified application, and includes a supporting frame having transversely spaced, parallel frame members 1. The pencil slats S are advanced to the detecting apparatus (which constitutes the subject of this invention and as hereinafter described in detail) by means of a central feeder chain 2 including spaced feed lugs 3, and after being momentarily freed from said chain 2 and disposed stationary in the detecting apparatus, the slats are engaged by a take-away chain unit including transversely spaced chains 4 having spaced slat engaging lugs 5, and thence passed to the segregating mechanism; all substantially as in said above identified application.

The improved detecting apparatus comprises a semi-crescent slat supporting shoe 6 disposed longitudinally immediately beyond the sprocket 7 which supports chain 2 at its discharge end; the shoe being fixed at one end on a transverse frame member 8 and at the other end closely overhanging the top reach of the chain to a point somewhat ahead of the point where said reach terminates and the chain begins to pass about the sprocket. The lugs 3 on chain 2 each comprise a fork which straddles the shoe 6 as the chain travels, as shown in Fig. 3. The upper edge 9 of the shoe is flat and is inclined upwardly somewhat from a feathered slat pick-up end 10. A slat hold-down arm 11 is fixed on and projects radially from a cross shaft 12; said hold down arm being substantially horizontal and extending over the shoe 6 in vertical alinement therewith. At its ends the shaft 12 is journaled as at 13 on beams 1; a torsion spring 14 being mounted on said shaft at one end to rotate said shaft 12 in a direction to move arm 11 toward shoe 6.

A pair of micro-switches 15 of standard make are fixed on shaft 12 in spaced relation, each being equidistant from the centrally mounted radial arm 11; the switches being encased in rigid housings as shown. A resilient right angle bracket 16 is secured on and depends from the forward end of each micro-switch housing and the horizontal leg of each such bracket is secured on a horizontal, longitudinally extending bar 17 intermediate the ends thereof. These bars extend forward a distance to overlie a slat held between arm 11 and shoe 6, and are pivoted at such end with depending slat engaging feeler plates 18 whose lower edge is horizontal and of a length greater than the width of such slat. Said lower edge of the plates is normally disposed in the same horizontal plane as the slat engaging edge of arm 11. Lateral arms 19 extend horizontally in opposite directions from arm 11 intermediate its ends and vertical adjustment or set screws 20 are threaded through the end portions of arms 19 from beneath and engage inwardly overhanging fingers 21 rigid with bars 17. Adjustable tension springs 22 between arms 19 and fingers 21 maintain set screws 20 and fingers 21 in engagement. The bars 17, at their other ends, are formed on the upper edge with upstanding pins 23 which normally depress switch buttons 24 of micro-switches 15; said switches being open when the buttons 24 are depressed into or toward the switch housings.

Another pair of micro-switches 25 are fixed with a transverse frame member 26 by longitudinal supporting frames 27; these switches likewise being spaced laterally and disposed in substantial alignment with but below switches 15. Resilient right angle brackets 28 are mounted on and depend from the back end of the housings of switches 25, and longitudinal bars 29 are secured on the horizontal legs of brackets 28 and extend forwardly under the switches and thence are offset upwardly and terminate at their forward ends as horizontal portions which carry upwardly extending feeler plates 30 corresponding to but in opposed relation to feeler plates 18. The feeler plates 30 engage across the under surface of a slat held between arm 11 and shoe 6, and the upper edge of said plates are normally in the same horizontal plane of the lower face of a perfect slat supported on shoe 6. The frames 27 extend forward inwardly of but adjacent bars 29, and laterally extending fingers 31 on frames 27 overlie said bars 29 adjacent plates 30. Adjustable set screws 32 are threaded through fingers 31 from above and engage bars 29, while adjustable tension springs 33 between fingers 31 and bars 29 yieldably maintain the set screws in engagement with said bars. Immediately ahead of brackets 28 the bars 29 carry upstanding pins 34 which normally press inwardly switch buttons 35 of micro-switches 25 and thus hold said switches open.

The above described structure comprises the warp detecting mechanism. As previously indicated, this improved detecting mechanism is associated with a circuit and electrically controlled segregating mechanism which is substantially the same as in the identified copending application. As shown diagrammatically in Fig. 6, a deflector plate 36 disposed above chains 4 and beyond the detecting mechanism, is provided with a lever 38 actuated from a cam 37 timed with the chains, and said lever 38 of said plate is normally held away from the cam 37 by an opposed winding electro-magnet 39 which is wired in circuit with a commutator 40 likewise synchronized with the slat conveying chains and cam 37. As in the copending application, and as is obvious, the circuit is arranged so that one winding W of the electro-magnet is always energized, holding lever 38 clear of the cam 37, while the other and opposed winding W' is normally deenergized and in circuit with commutator 40 and an electronic relay or grid glow tube 41 which is normally biased; the micro-switches 15 and 25 are wired in parallel relation and are here substituted for the selector or contact plates in the copending application. If anyone of said micro-switches 15 or 25 is closed, the tube 41 "fires" resulting in current passing to winding W through commutator 40 and balancing the electro-magnet whereupon lever 38 is released and cam actuated to operate deflector plate 36 and deflect the slat which closed said micro-switch.

The warp detecting mechanism functions as follows to close one or more of said switches 15 and 25 when a warped slat comes to detecting position. As a slat is fed by chain 2, it is picked up by shoe 6 and carried along the upper edge of such shoe until only the trailing edge portion of said slat is engaged between the shoe and hold-down arm 11 as clearly shown in Fig. 5. When the slat is so disposed, lugs 3 of chain 2 fall away from the slat and the latter remains stationary for a moment and until lugs 5 of chain 4, moving up about the adjacent sprockets 4a, engage the slat and carry it toward the segregating mechanism. While the slat is in such stationary position the feeler plates 18 and 30 engage transversely across the upper and lower surfaces respectively of the slat and adjacent the ends thereof. If the slat is true, the feeler plates remain in normal position and with the micro-switches open. However, if the slat is warped in any direction, one or more of the feeler plates (18 or 30) will be urged out of its normal position swinging the connected bar (17 or 29) through the medium of the corresponding resilient bracket (16 or 28) and backing the corresponding pin (23 or 34) in a direction away from the engaged switch button (24 or 35) whereupon the switch (15 or 25) closes, actuating the segregating mechanism in the manner as heretofore described. As the slat is engaged between shoe 6 and arm 11 adjacent one edge of the slat and the major portion of the slat thus being suspended in space, the feeler plates can detect a warp with much greater accuracy than could otherwise be accomplished.

By reason of the fact that the feeler plates 18 are carried so as to rise and fall with arm 11 (as shaft 12 is a common support for both), a slat of a thickness varying from normal but not warped will not cause the warp detecting mechanism to function.

The thickness detecting mechanism which is embodied in the apparatus comprises a forward extension 42 on arm 11; such extension projecting beyond the feeler plate assembly and having an upward offset therein as shown. At its forward end, the extension carries an upstanding pin 43 and a depending pin 44, both of which are rigid therewith. A right angle beam 45 extends transversely above frame members 1 and is supported by means of vertical posts 46 upstanding from members 1; the top portion of beam 45 being slotted from the edge as at 47 and engaged under hand bolts 48 threaded into the upper ends of said posts. The other portion of the beam 45 depends as a vertical skirt in front of or beyond the free end of extension 42.

A pair of supports 49 are pivoted intermediate their ends, as at 50, on the depending portion of beam 45 and for swinging movement in a transverse vertical plane; said supports being mounted on opposite sides of extension 42 which projects therebetween. A compression spring 51 is mounted between the outer end of each support 49 and the top portion of beam 45, while manually adjustable set screws 52 are threaded through said top portion of the beam 45 and each contacts said supports on the other side of their pivots and limits upward movement of the supports. A micro-switch 53 including a housing is mounted on each support inwardly of the pivot and each switch includes a switch button 54 which when pressed inwardly holds the switch open; the switch housings being inverted one relative to the other. A bar 55 extends substantially horizontal adjacent each switch housing and the switch button; the outer end of each bar 55 having a leaf spring 56 fixed on and projecting therefrom and rigidly connected with the corresponding support 49 as at 57.

At their inner ends, one bar overhangs extension 42 while the other bar extends below the same; said ends of bars 55 having fixed pins 58 and 59 aligned with but set to be normally slightly spaced from pins 43 and 44 on extension 42 when a slat of correct thickness is disposed between the arm 11 and shoe 6. This set is obtained by adjustable set screws 60 which are threaded through bars 55 and abut against shoulders 61 on the supports 49 while adjustable tension springs 62 maintain the set screws 60 in engagement with the bars. Pins 63 intermediate the ends of bars 55 project toward and engage switch buttons 54 normally holding the latter pressed inwardly and the switches open. A stop 64 is fixed beneath extension 42 and limits undue downward movement of said extension when no slat is disposed between arm 11 and shoe 6.

The above described thickness detecting mechanism functions as follows: When a slat which is too thick or too thin is disposed and held between arm 11 and shoe 6, the extension 42 rises or falls, as the case may be, from a normal position. When this occurs pins 43 and 58, or pins 44 and 59, engage and the corresponding bar 55 is deflected sufficiently to move the pin 63 in a direction to permit switch button 54 of the corresponding switch to move in a direction to close said switch. These switches 53 are likewise wired in parallel in the circuit and when one of said switches is closed, the segregating mechanism functions to segregate the slat which was too thick or too thin. Rough adjustment for thickness or thinness detecting is had by proper manipulation of one screw 52 or the other, while sensitive adjustment is obtained by adjusting set screws 60.

The apparatus above described thus functions simultaneously and effectively to both detect for warp, and thickness variation in objects and particularly pencil slats.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. Detecting mechanism for pencil slat segregating apparatus which includes a frame, a slat conveyor, the slats being disposed flat on said conveyor, a slat segregating mechanism associated with the conveyor, and an electrically actuated control assembly for the segregating mechanism, the assembly including a pair of normally open switches, the closing of either of which effects actuation of the control assembly; said detecting mechanism being mounted on the frame ahead of the segregating mechanism and comprising a fixed slat receiving and supporting shoe adapted to support each slat from beneath, an arm pivoted above the shoe and adapted to engage each slat from above, a transverse bar overhanging the arm at its free end and adapted to be engaged thereby, another transverse bar underhanging the arm at its free end and adapted to be engaged thereby, means mounting said bars for deflection when engaged by the arm, and means between each bar and different ones of the switches arranged to close the corresponding switch upon deflection of such bar.

2. A device as in claim 1 in which said bar mounting means includes resilient end portions projecting from opposite ends thereof, supports mounted in connection with the frame adjacent said resilient end portions of the bars, means mounting said end portions on the supports; said switches being mounted on the supports.

3. Detecting mechanism for pencil slat segregating apparatus which includes a frame, a slat conveyor, the slats being disposed flat on said conveyor, a slat segregating mechanism associated with the conveyor, and an electrically actuated control assembly for the segregating mechanism, the assembly including a pair of normally open switches, the closing of either of which effects actuation of the control assembly; said detecting mechanism being mounted on the frame ahead of the segregating mechanism and comprising a fixed slat receiving and supporting shoe adapted to support each slat from beneath, an arm pivoted above the shoe and adapted to engage each slat from above, a transverse bar overhanging the arm at its free end and adapted to be engaged thereby, another transverse bar underhanging the arm at its free end and adapted to be engaged thereby, resilient end portions projecting from opposite ends of the bars, separate supports for said end portions of the bars, means separately mounting said supports on the frame for individual adjustment in a direction to adjust the spacing between said arm and the bars, one of said switches being fixed on each of the supports, and means between the bars and the switches arranged to close the corresponding switch upon deflection of one bar by said arm.

4. A device as in claim 3 including springs associated with the bars and urging the same toward the arm, and adjustable set screws between the arm and the support to limit such movement of said bars.

5. A device as in claim 3 in which said supports are pivoted in connection with the frame at points remote from the plane of the arm, and including means to manually alter the position of each support about its pivot.

6. Detecting mechanism for pencil slat segregating apparatus which includes a frame, a slat conveyor, the slats being disposed flat on said conveyor, a slat segregating mechanism associated with the conveyor, and a control assembly for the segregating mechanism, the assembly including a movable element whose movement effects actuation of said control assembly; said detecting mechanism being mounted on the frame ahead of the segregating mechanism and comprising a fixed slat receiving and supporting shoe adapted to support each slat from beneath, a movable slat engaging member adapted to engage each slat from above, a feeler member, the slat engaging surface of said feeler member normally being disposed in the same plane as the slat engaging surface of said slat engaging member, means mounting the feeler member for movement with the slat engaging member and in movable relation thereto in a direction away from said normal plane, the feeler member being disposed to engage with and across a slat between its side edges, and means between the feeler mounting means and said movable element of the control assembly arranged to move said movable element upon movement of the feeler member out of said normal plane.

7. A device as in claim 6 in which said control assembly includes another movable element whose movement effects actuation of the control assembly; and in which the detecting mechanism includes another feeler member, means mounting said other feeler member in position to engage across the opposite side of a supported slat and for movement away from such slat, the slat engaging surface of said other feeler member normally being disposed in the same plane as the slat engaging surface of the slat supporting shoe, and means between the feeler mounting means and said other movable element of the control assembly arranged to move said other movable element upon movement of said other feeler member out of said normal plane.

8. Warp detecting mechanism for pencil slat segregating apparatus which includes a frame, a slat conveyor, the slats being disposed flat on the conveyor, a slat segregating mechanism associated with the conveyor, and an electrically actuated control assembly for the segregating mechanism, the assembly including a control switch therein; the warp detecting mechanism comprising a slat receiving and supporting unit including a fixed shoe adapted to engage one side of a supported slat; an arm having one surface thereof adapted to engage the other side of a supported slat, means pivoting said arm for swinging movement to and from the shoe, a feeler plate adapted to engage across a supported slat from edge to edge thereof, the slat engaging surface of the feeler plate normally being disposed in the same plane as the slat engaging surface of the arm, means mounting the feeler plate for moving with the arm and also in movable relation thereto in a direction away from said normal plane, and means between the feeler plate mounting means and said switch arranged to close the switch upon movement of the feeler plate out of said normal plane.

9. Warp detecting mechanism for pencil slat segregating apparatus which includes a frame, a slat conveyor, the slats being disposed flat on the conveyor, a slat segregating mechanism associated with the conveyor, and an electrically actuated control assembly for the segregating mechanism, the assembly including a control switch therein; the warp detecting mechanism comprising a transverse shaft rotatably mounted on the frame, a radial arm fixed on the shaft and overhanging the conveyor, a fixed shoe mounted beneath the arm, each conveyed slat being engaged between the arm and the shoe, means urging the arm in the direction of the shoe, a feeler plate disposed to one side of the arm and arranged to engage across a supported slat from edge to edge thereof, the slat engaging surfaces of the arm and the plate normally being in the same plane, a bar fixed on the feeler plate and extending toward the shaft, means including a resilient element mounting the bar in connection with the shaft radially thereof, the switch being fixed in connection with the shaft, and means between the resiliently mounted bar and the switch arranged to actuate the latter upon movement of the feeler plate out of said normal plane by a warped slat.

10. A device as in claim 9 in which said arm urging means comprises a torsion spring associated with the shaft; there being a stop element to limit movement of the arm toward the shoe.

11. A device as in claim 9 in which the arm includes a lateral arm projecting toward and terminating adjacent said bar, a portion of the bar overhanging the end of said lateral arm, an adjustable set screw between the lateral arm and said bar portion, and a tension spring unit between the lateral arm and said bar portion.

12. Warp detecting mechanism for pencil slat segregating apparatus which includes a frame, a slat conveyor, the slats being disposed flat on the conveyor, a slat segregating mechanism associated with the conveyor, and an electrically actuated control assembly for the segregating mechanism, the assembly including a control switch therein; the warp detecting mechanism comprising a transverse shaft rotatably mounted on the frame, a radial arm fixed on the shaft and overhanging the conveyor, a fixed shoe mounted beneath the arm, each conveyed slat being engaged between the arm and the shoe, means urging the arm in the direction of the shoe, a feeler plate disposed to one side of the arm and arranged to engage across a supported slat from edge to edge thereof, the slat engaging surfaces of the arm and the plate normally being in the same plane, a bar fixed on the feeler plate and extending toward the shaft, a housing fixed on the shaft, the switch being mounted in said housing and having a control element projecting therefrom, a resilient bracket connected between the housing and said bar, and means on the bar arranged to actuate said switch control element by deflection of the bar upon the feeler plate engaging across a warped slat disposed between the shoe and arm.

13. Warp detecting mechanism for pencil slat segregating apparatus which includes a frame, a slat conveyor, the slats being disposed flat on the conveyor, a slat segregating mechanism associated with the conveyor, and an electrically actuated control assembly for the segregating mechanism, the assembly including a pair of separate control switches therein; the warp detecting mechanism comprising a transverse shaft rotatably mounted on the frame, a radial arm fixed on the shaft and overhanging the conveyor, a fixed shoe mounted beneath the arm, each conveyed slat being engaged between the arm and the shoe transversely of said arm, the arm resting on the slat intermediate its ends, means urging the arm in the direction of the shoe, a feeler plate disposed on each side of the arm and disposed to engage across a supported slat from edge to edge thereof and adjacent its ends, the slat engaging surfaces of the arm and the feeler plates normally being in the same plane, a bar fixed on each feeler plate and extending toward the shaft, means including resilient elements mounting the bars in connection with the shaft, the switches being fixed in connection with the shaft and each being disposed adjacent one bar, and means between each of the resiliently mounted bars and the corresponding switch arranged to actuate said switch upon movement of the corresponding feeler plate out of said normal plane by a warped slat.

14. In pencil slat segregating apparatus, a frame, a slat segregating mechanism mounted on the frame and including a control assembly having a movable element whose movement effects actuation of said assembly, a slat supporting shoe adapted to support a pencil slat ahead of the segregating mechanism, a conveyor unit arranged to feed pencil slats one at a time onto said shoe and to a momentarily stationary position thereon, said conveyor unit being arranged to thereafter withdraw each slat and feed same to the segregating mechanism, and a warp and thickness detecting mechanism mounted on the frame adjacent said shoe and including warp and thickness responsive feeler members adapted to engage each shoe supported slat, and means between the detecting mechanism and said movable element arranged to move the same upon engagement of said feeler members with a slat having warp or thickness characteristics varying from a predetermined normal.

15. A device as in claim 14 in which each slat, when in stationary position, is supported from adjacent one edge only.

16. In pencil slat segregating apparatus, a frame, slat segregating mechanism mounted on the frame and including a control assembly having a movable element whose movement effects actuation of the assembly, a slat supporting unit including relatively movable members adapted to engage a slat on opposite sides, a conveyor unit arranged to feed pencil slats one at a time into said slat supporting unit to a momentarily stationary position therein and with the slat supported from adjacent one edge only, and to thereafter withdraw the slat and feed same to the segregating mechanism, a warp detecting mechanism mounted on the frame adjacent said slat supporting unit and including a feeler member adapted to engage each supported slat, and means between the detecting mechanism and said movable element arranged to move the same upon engagement of the feeler member with a supported slat having a warp therein.

17. Detecting mechanism for article segregating apparatus which includes an article conveyor, article segregating mechanism associated with the conveyor, and a control assembly for the segregating mechanism; said detecting mechanism being associated with the conveyor ahead of the segregating mechanism and comprising a fixed element adapted to engage each conveyed article on one side thereof, a movable element adapted to simultaneously engage each conveyed article on the other side thereof, a feeler member, the article engaging surface of said feeler member normally being disposed in substantially the same plane as the article engaging surface of said movable element, means mounting the feeler member for movement with said movable element and in movable relation thereto in a direction out of said normal plane, the feeler member being disposed in position to engage with each article at a point some distance from said movable element, and means between the feeler member and said control assembly to actuate the latter upon such relative movement of the former.

18. Detecting mechanism for article segregating apparatus which includes an article conveyor, article segregating mechanism associated with the conveyor, and a control assembly for the segregating mechanism; said detecting mechanism being associated with the conveyor ahead of the segregating mechanism and comprising a fixed element adapted to engage each conveyed article on one side thereof, a movable element adapted to simultaneously engage each conveyed article on the other side thereof, means between the movable element and said control mechanism to actuate the latter upon predetermined movement of said movable element, a feeler member adapted to engage one side of each article, means mounting the feeler member for movement with said movable element and in movable relation thereto, and other means between the feeler member and said control mechanism to actuate the latter upon predetermined movement of said feeler member relative to said movable element.

19. In pencil slat segregating apparatus, a frame, a slat segregating mechanism mounted on the frame and including a control assembly having a movable element whose movement effects actuation of said assembly, a slat supporting shoe adapted to support a pencil slat ahead of the segregating mechanism, a conveyor unit arranged to feed pencil slats one at a time onto said shoe and to a momentarily stationary position thereon, said conveyor unit being arranged to thereafter withdraw each slat and feed same to the segregating mechanism, detecting mechanism mounted on the frame adjacent said shoe, said mechanism including a feeler member arranged to engage each shoe supported slat and responsive to a predetermined physical characteristic thereof, and means between said detecting mechanism and said movable element arranged to move the latter upon engagement of said feeler member with a slat having such physical characteristic.

20. In apparatus to detect a predetermined physical characteristic in pencil slats, a frame, a slat conveyor associated with the frame, a slat supporting unit mounted on the frame adjacent the conveyor, said unit engaging each slat separately and with the slat supported adjacent one edge only, and detecting mechanism mounted on the frame adjacent the supporting unit, said mechanism including a feeler member responsive to such physical characteristic and adapted to engage each supported slat from substantially edge to edge thereof.

21. A device as in claim 20 in which each slat is supported adjacent one longitudinal edge thereof and substantially centrally of its ends; the feeler member extending transversely of each slat and engaging the same adjacent one end thereof.

WILLIAM H. WILCOX.